US008805274B2

(12) United States Patent
Fitzpatrick et al.

(10) Patent No.: US 8,805,274 B2
(45) Date of Patent: Aug. 12, 2014

(54) FREQUENCY TRANSLATION MODULE INTERFACE

(75) Inventors: John James Fitzpatrick, Indianapolis, IN (US); Lincheng Xiu, Carmel, IN (US)

(73) Assignee: Thomson Licensing, Issy les Moulineaux (FR)

( * ) Notice: Subject to any disclaimer, the term of this patent is extended or adjusted under 35 U.S.C. 154(b) by 477 days.

(21) Appl. No.: 12/449,083

(22) PCT Filed: Jan. 25, 2007

(86) PCT No.: PCT/US2007/001891
§ 371 (c)(1),
(2), (4) Date: Jul. 22, 2009

(87) PCT Pub. No.: WO2008/091255
PCT Pub. Date: Jul. 31, 2008

(65) Prior Publication Data
US 2010/0105318 A1 Apr. 29, 2010

(51) Int. Cl.
*H04B 7/185* (2006.01)
*H04B 1/44* (2006.01)

(52) U.S. Cl.
USPC ........ 455/12.1; 455/78; 455/13.4; 455/343.1; 455/332; 455/333

(58) Field of Classification Search
None
See application file for complete search history.

(56) References Cited

U.S. PATENT DOCUMENTS 3,624,449 A 11/1971 Morgan
5,422,777 A 6/1995 Pezzani
5,937,337 A 8/1999 Marrah et al.
5,969,748 A 10/1999 Casement et al.
6,195,245 B1 2/2001 Kobsa
6,240,281 B1 5/2001 Le Roux et al.
6,826,391 B2 * 11/2004 Leinonen et al. .......... 455/277.1
6,933,766 B2 * 8/2005 Khlat et al. .................. 327/359
6,957,039 B2 10/2005 Imai
6,975,211 B2 12/2005 Atsuta et al.

(Continued)

FOREIGN PATENT DOCUMENTS

DE 1488913 10/1969
EP 0193989 9/1986

(Continued)

OTHER PUBLICATIONS

International Search Report, dated Aug. 6, 2007.

(Continued)

*Primary Examiner* — Yuwen Pan
*Assistant Examiner* — Fanghwa Wang
(74) *Attorney, Agent, or Firm* — Robert D. Shedd; Kuniyuki Akiyama

(57) ABSTRACT

An architecture and protocol enables signal communications between either a frequency translation module and a decoder within a dwelling, or between an antenna and a decoder within a dwelling. According to an exemplary embodiment, the decoder comprises a switch 33 between the low noise block converter power supply, and a transceiver and output coupling. The switch 33 generates a high impedance during operation of the frequency translation module and the LNB power supply 38, thereby isolating the transceiver and the output coupling from the LNB power supply. The switch generates a low impedance between the LNB power supply and the transceiver and output coupling during operation of the LNB power supply.

2 Claims, 5 Drawing Sheets

(56) References Cited

U.S. PATENT DOCUMENTS

| | | | |
|---|---|---|---|
| 7,054,127 | B1 | 5/2006 | Scearce et al. |
| 7,130,576 | B1 | 10/2006 | Gurantz et al. |
| 7,953,366 | B2 | 5/2011 | Couet |
| 2001/0038318 | A1* | 11/2001 | Johnson et al. ............... 331/135 |
| 2002/0056134 | A1 | 5/2002 | Abe et al. |
| 2003/0022644 | A1 | 1/2003 | Imai |
| 2003/0141949 | A1 | 7/2003 | Couet |
| 2004/0122531 | A1 | 6/2004 | Atsuta et al. |
| 2004/0196174 | A1* | 10/2004 | Okahashi ........................ 342/91 |
| 2005/0289605 | A1 | 12/2005 | Jeon |
| 2006/0225102 | A1 | 10/2006 | James |
| 2008/0094766 | A1 | 4/2008 | Casey |

FOREIGN PATENT DOCUMENTS

| | | |
|---|---|---|
| EP | 0490788 | 6/1992 |
| JP | UM55130548 | 3/1979 |
| JP | UM63174735 | 11/1988 |
| JP | 2/256360 | 10/1990 |
| JP | UM05062150 | 8/1993 |
| JP | 10-50937 | 2/1998 |
| JP | 11068603 | 3/1999 |
| JP | 2000341161 | 12/2000 |
| JP | 2001/211090 | 8/2001 |
| JP | 200216524 | 1/2002 |
| JP | 2003124832 | 4/2003 |
| JP | 2003298444 | 10/2003 |
| JP | 2004201065 | 7/2004 |
| WO | WO2006065747 | 6/2006 |
| WO | WO2006119490 | 11/2006 |
| WO | WO2008091254 | 7/2008 |

OTHER PUBLICATIONS

Non-final Office Action from U.S. Appl. No. 12/449,077 dated Jan. 27, 2011.

Notice of Allowance from U.S. Appl. No. 12/449,077 dated Sep. 9, 2011.

Notice of Allowance from U.S. Appl. No. 12/449,077 dated Oct. 28, 2011.

PCT Search Report from PU060173 dated Aug. 6, 2007

PCT Search Report from Related Case PU060253 dated May 25, 2007.

* cited by examiner

100

20

FREQUENCY TRANSLATION MODULE INTERFACE

This application claims the benefit, under 35 U.S.C. §365 of International Application PCT/US2007/001891 filed Jan. 25, 2007, which was published in accordance with PCT Article 21(2) on Jul. 31, 2008 in English.

BACKGROUND OF THE INVENTION

1. Field of the Invention

The present invention generally relates to signal communications, and more particularly, to an architecture and protocol for enabling signal communications between a frequency translation apparatus, which may be referred to herein as a frequency translation module (FTM), and an integrated receiver-decoder (IRD) or between a low noise block converter (LNB) and an IRD.

2. Background Information

In a satellite broadcast system, one or more satellites receive signals including audio and/or video signals from one or more earth-based transmitters. The satellite(s) amplify and rebroadcast these signals to signal receiving equipment at the dwellings of consumers via transponders that operate at specified frequencies and have prescribed bandwidths. Such a system includes an uplink transmitting portion (i.e., earth to satellite(s)), an earth-orbiting satellite receiving and transmitting portion, and a downlink portion (i.e., satellite(s) to earth).

In dwellings that receive signals from a satellite broadcast system, signal receiving equipment may be used to frequency shift portions of a frequency band or the entire broadcast spectrum of the satellite(s), and frequency stack the resultant output onto a single coaxial cable. However, as the number of satellites within a satellite broadcast system increases, and with the proliferation of high definition satellite channels, a point will be reached where the total bandwidth required to accommodate all of the satellites will exceed the transmission capability of the coaxial cable. It has become necessary for the satellite decoder industry to implement more satellite slots into their distribution systems. To provide for the increased number of satellite slot transmissions a more elaborate means for satellite configurations selection is required. Two primary methods used now used now for selecting these various configurations are the legacy LNB power supply method and the new Frequency Translation Module (FTM) method.

The legacy LNB power supply method controls satellite RF band selection by voltage level and a superimposed, 600 mvp-p, 22 kHz tone or lack of tone. Tone selection is accomplished by either a constant tone or a Pulse Width Modulated (PWM) tone. The industry standard for the PWM tone is called DiSEqC and is defined in the Eutelsat DiSEqC Bus Functional Specification. The two stage, output to voltage (13 or 18 volts) is typically used to select the polarity of incoming satellite signals and the tone selects various satellite slots in space.

The second method (FTM) is self powered, therefore, it does not require an LNB power supply, and uses a UART controlled 2.3 MHz, Frequency Shift Key (FSK) modulation scheme to communicate selection commands to the satellite configuration switch. The FTM switch is designed to select a satellite signal transponder from a host of satellite receiver antennas and translate it, in frequency, to a single transponder band. This new frequency shifted transponder band is then sent to the satellite decoder box through the connecting coaxial cable.

Present day satellite decoder systems need the ability to switch between these two communication methods and operate in either mode without being disturbed by the other system. If a satellite receiver system is capable of FTM operation, the conventional LNB power supply will be disabled such that all control and selection of the available satellite signals is done with the modulated 2.3 MHz, FTM communication channel. However, the LNB power supply has a low output impedance that distorts the 2.3 MHz of the FTM carrier when directly connected to the FTM circuit. The resulting distortion causes signal degradation and contamination of higher frequency bands with parasitic harmonics. The present invention described herein addresses this and/or other problems.

SUMMARY OF THE INVENTION

In accordance with an aspect of the present invention, an apparatus for controlling an antenna in a first mode of operation and a second mode of operation is disclosed. According to an exemplary embodiment, the apparatus comprises, a first transceiver for sending and receiving control signals in the first mode of operation through a first coupling point, wherein said first coupling point is coupled to the antenna, a second transceiver for sending and receiving control signals and for supplying a power supply voltage in the second mode of operation to said antenna through a second coupling point, and a switch coupled between said first coupling point and said second coupling point wherein said switch represents a first impedance during the first mode of operation and a second impedance lower than the first impedance during the second mode of operation.

In accordance with another aspect of the present invention, a method for controlling an antenna in one of two operating modes is disclosed. According to an exemplary embodiment, the method comprises steps of receiving a command to operate in a first mode of operation, enabling a first transceiver in response to said command to operate in a first mode of operation, receiving a command to operate in said second mode of operation; and enabling a second transceiver and a source of impedance to isolate said first transceiver from said second transceiver in response to said command to operate in a second mode of operation.

In accordance with another aspect of the present invention, a satellite signal processing apparatus is disclosed. According to an exemplary embodiment, the satellite signal processing apparatus comprises a first processing means for controlling a low noise block converter in a first mode of operation, a second processing means for controlling a low noise block converter in a second mode of operation, and a switching means for generating an impedance for isolating said first processing means from said low noise block converter during said second mode of operation and for coupling said first processing means to said low noise block converter during said first mode of operation

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

It is desirable to disconnect the low impedance LNB power supply output impedance from the FTM circuits when in the FTM mode by effectively raising the LNB power supply output impedance when in the FTM mode. As a voltage source, conventional LNB power supplies represent a low impedance to ground. This low impedance, if uninterrupted, overloads the modulated 2.3 MHz FTM signal causing waveform distortion. This invention disconnects the low impedance output of the LNB supply from the 2.3 MHz communication network.

Figure 1:
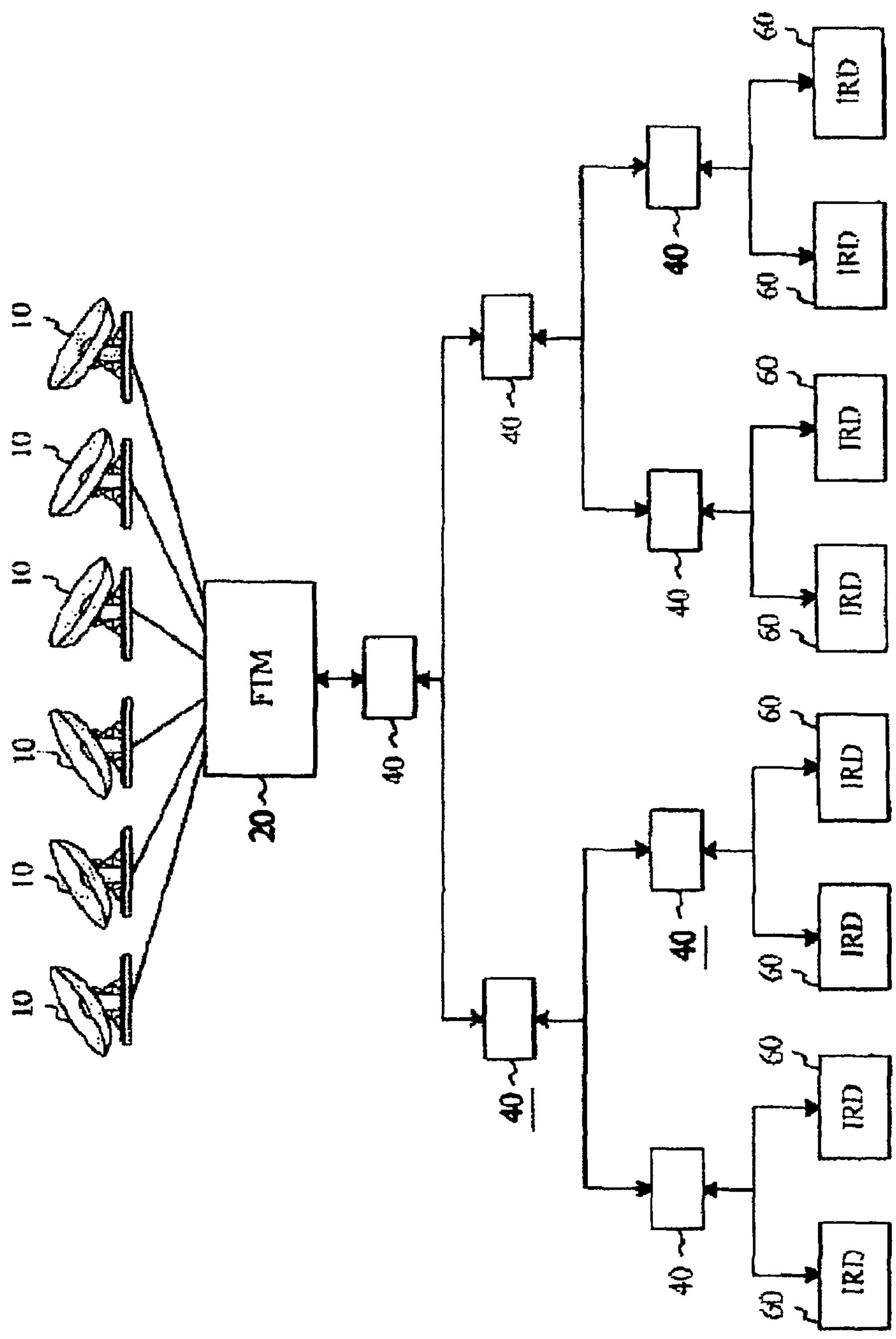
FIG. 1 is a diagram showing an exemplary environment for implementing the present invention.

Referring now to the drawings, and more particularly to FIG. 1, a diagram of an exemplary environment 100 for implementing the present invention is shown. Environment 100 of FIG. 1 comprises a plurality of signal receiving means such as signal receiving elements or devices 10, such as parabolic antennas in is exemplary embodiment of the invention, frequency translating means such as FTM 20, a plurality of signal splitting means such as signal splitters 40, and a plurality of signal receiving and decoding means such as IRDs 60. According to an exemplary embodiment described herein, the aforementioned elements Of environment 100 are operatively coupled to one another via a transmission medium such as coaxial cable, although other types of transmission mediums may also be used according to the present invention. Environment 100 may for example represent a signal communication network within a given household and/or business dwelling.

Signal receiving elements 10 are each operative to receive signals including audio, video, and/or data signals (e.g., television signals, etc.) from one or more signal sources, such as a satellite broadcast system and/or other type of signal broadcast system. According to an exemplary embodiment, signal receiving element 10 is embodied as an antenna such as a satellite receiving dish, but may also be embodied as any type of signal receiving element.

FTM 20 is operative to receive signals including audio, video, and/or data signals (e.g., television signals, etc.) from signal receiving elements 10, and process the received signals using functions including signal frequency shifting, band pass filtering and frequency translation functions to generate corresponding output signals that are provided to IRDs 60 via coaxial cable and signal splitters 40. According to an exemplary embodiment, FTM 20 may communicate with up to 12 IRDs 60 within a single dwelling. For purposes of example and explanation, however, FIG. 1 shows FTM 20 connected to 8 IRDs 60 using simple two-way signal splitters 40. Further exemplary details regarding FTM 20, and its ability to communicate with IRDs 60 will be provided later herein.

Signal splitters 40 are each operative to perform a signal splitting and/or repeating function. According to an exemplary embodiment, signal splitters 40 are each operative to perform a 2-way signal splitting function to facilitate signal communication between FTM 20 and IRDs 60.

IRDs 60 are each operative to perform various signal receiving and processing functions including signal tuning, demodulation and decoding functions. According to an exemplary embodiment, each IRD 60, is operative to tune, demodulate and decode signals provided from FTM 20 via signal splitters 40, and enable aural and/or visual outputs corresponding to the received signals. As will be described later herein, such signals are provided from FTM 20 to IRDs 60 responsive to request commands from IRDs 60, and such request commands may each represent a request for a desired band of television signals. With a satellite broadcast system, each request command may for example indicate a desired satellite and/or a desired transponder. The request commands may be generated by IRDs 60 responsive to user inputs (e.g., via remote control devices, etc.).

According to an exemplary embodiment, each IRD 60 also includes an associated audio and/or video output device such as a standard-definition (SD) and/or high-definition (HD) display device. Such display device may be integrated or non-integrated. Accordingly, each IRD 60 may be embodied as a device such as a television set, computer or monitor that includes an integrated display device, or a device such as a set-top box, video cassette recorder (VCR), digital versatile disk (DVD) player, video game box, personal video recorders (PVR), computer or other device that may not include an integrated display device.

Figure 2:
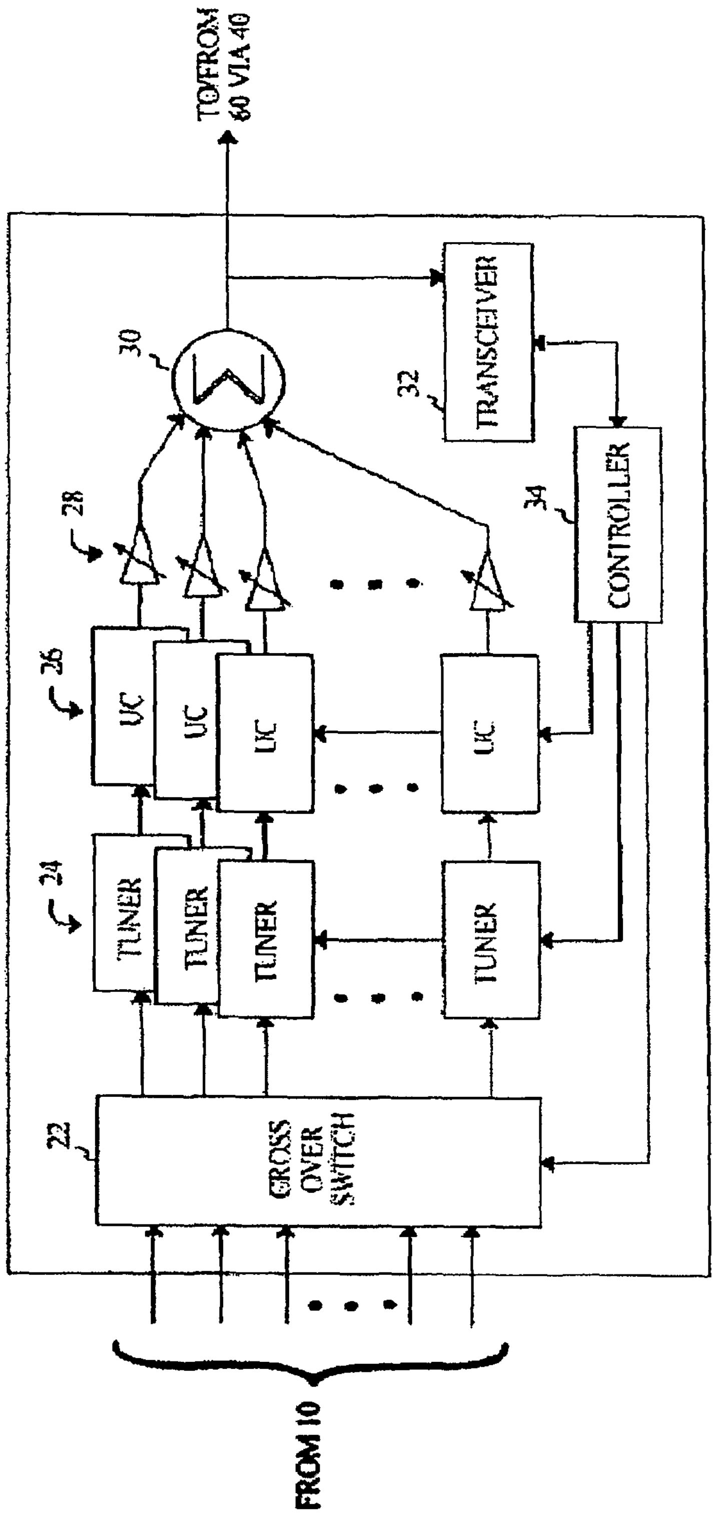
FIG. 2 is a block diagram showing further details of the FTM of FIG. 1 according to an exemplary embodiment of the present invention.

Referring to FIG. 2, a block diagram providing further details of FTM 20 of FIG. 1 according to an exemplary embodiment of the present invention is shown. FTM of FIG. 2 comprises switching moans such as cross over switch 22, a plurality of tuning means such as tuners 24, comprising local oscillators and band pass filters, a plurality of frequency converting means such as frequency up converters (UCs) 26, a plurality of amplifying means such as variable gain amplifiers 28, signal combining means such as signal combiner 30, transceiving means such as transceiver 32, and control means such as controller 34. The foregoing elements of FTM 20 may be implemented using integrated circuits (ICs), and one or more elements may be included on a given IC. Moreover, a given element may be included on more than one IC. For clarity of description, certain conventional elements associated with FTM 20 such as certain control signals, power signals and/or other elements may not be shown in FIG. 2.

Cross over switch 22 is operative to receive a plurality of input signals from signal receiving elements 10. According to an exemplary embodiment, such input signals represent various bands of radio frequency (RF) television signals. With a satellite broadcast system, such input signals may for example represent L-band signals, and cross over switch 22 may include an input for each signal polarization used within the system. Also according to an exemplary embodiment, cross over switch 22 selectively passes the RF signals from its inputs to specific designated tuners 24 responsive to control signals from controller 34.

Tuners 24 are each operative to perform a signal tuning function responsive to a control signal from controller 34. According to an exemplary embodiment, each tuner 24 receives an RF signal from cross over switch 22, and performs the signal tuning function by band pass filtering and frequency down converting (i.e., single or multiple stage down conversion) the RF signal to thereby generate an intermediate frequency (IF) signal. The RF and IF signals may include audio, video and/or data content (e.g., television signals, etc.), and may be of an analog signal standard (e.g., NTSC, PAL, SECAM, etc.) and/or a digital signal standard (e.g., ATSC, QAM, QPSK, etc.). The number of tuners 24 included in FTM 20 is a matter of design choice.

Frequency up converters (UCs) 26 are each operative to perform a frequency translation function. According to an exemplary embodiment, each frequency up converter (UC) 26 includes a mixing element and a local oscillator (not shown in FIGS.) that frequency up converts an IF signal provided from a corresponding tuner 24 to a designated frequency band responsive to a control signal from controller 34 to thereby generate a frequency up converted signal.

Variable gain amplifiers 28 are each operative to perform a signal amplification function. According to an exemplary embodiment, each variable gain amplifiers 28 is operative to amplify a frequency converted signal output from a corresponding frequency up converter (UC) 26 to thereby generate an amplified signal. Although not expressly shown in FIG. 2, the gain of each variable gain amplifier 28 may be controlled via a control signal from controller 34.

Signal combiner 30 is operative to perform a signal combining (i.e., summing) function. According to an exemplary embodiment, signal combiner 30 combines the amplified signals provided from variable gain amplifiers 28 and outputs the resultant signals onto a transmission medium such as coaxial cable for transmission to one or more IRDs 60 via signal splitters 40.

Transceiver 32 is operative to enable communications between FTM 20 and IRDs 60. According to an exemplary embodiment, transceiver 32 receives various signals from IRDs 60 and relays those signals to controller 34. Conversely, transceiver 32 receives signals from controller 34 and relays those signals to one or more IRDs 60 via signal splitters 40. Transceiver 32 may for example be operative to receive and transmit signals in one or more predefined frequency bands.

Controller 34 is operative to perform various control functions. According to an exemplary embodiment, controller 34 receives request commands for desired bands of television signals from IRDs 60. As will be described later herein, each IRD 60 may transmit its request command to FTM 20 during a separate time slot that is assigned by controller 34. With a satellite broadcast system, a request command may indicate a desired satellite and/or a desired transponder that provides a desired band of television signals. Controller 34 enables signals corresponding to the desired bands of television signals to be transmitted to corresponding IRDs 60 to responsive to the request commands.

According to an exemplary embodiment, controller 34 provides various control signals to cross over switch 22, tuners 24, and frequency up converters (UCs) 26 that cause the signals, corresponding to the desired bands of television signals to, be transmitted to IRDs 60 via a transmission medium such as coaxial cable. Controller 34 also provides acknowledgement responses to IRDs 60 responsive to the request commands which indicate the frequency bands (e.g., on the coaxial cable, etc.) that will be used to transmit the signals corresponding to the desired bands of television signals to IRDs 60. In this manner, controller 34 may allocate the available frequency spectrum of the transmission medium (e.g., coaxial cable, etc.) so that all IRDs 60 can receive desired signals simultaneously.

Figure 3:
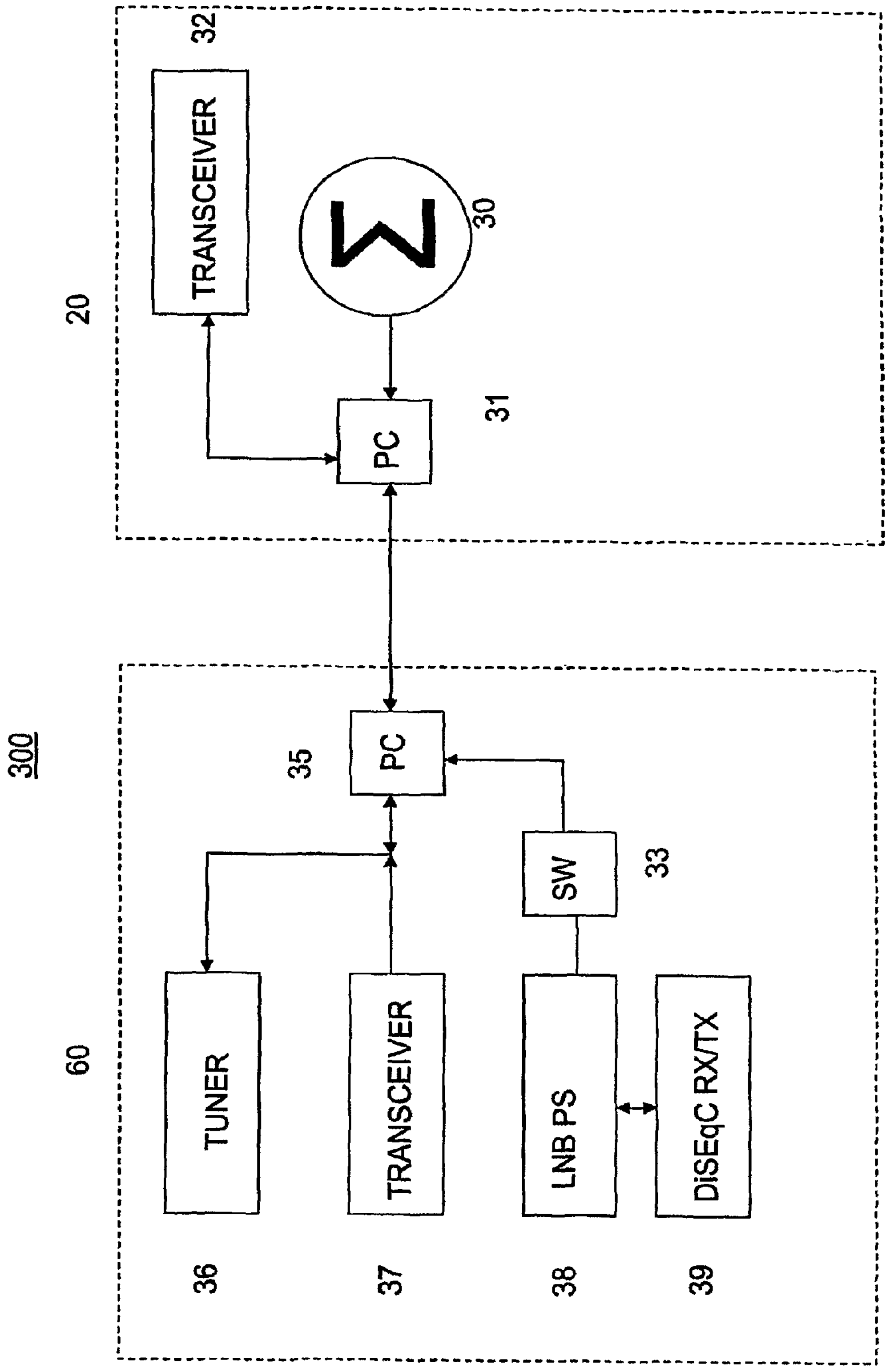
FIG. 3 is a diagram showing further details of the LNB and IRD LNB control transceivers according to an exemplary embodiment of the present invention.

Referring to FIG. 3, shows a diagram of an exemplary environment 300 for implementing the present invention is shown showing further details of the interconnectivity between the FTM 20 and IRD 60 of FIG. 1. Environment 300 of FIG. 3 comprises a protection circuit 31, a transceiver 32, and a signal combiner 30 within the FTM 20. Within the IRD 60, a tuner 36, a transceiver 37, an LNB power supply 38, a DiSEqC encoder/decoder 39, a switch 33, and a protection circuit 35.

Protection circuit 31 is operative to pass desired signals, such as FTM control signals and television signals without distortion while protecting the FTM circuitry from lightning surge and other environmental electrical disturbances. According to an exemplary embodiment, protection circuit 31 comprises surge protection diodes implemented to absorb energy from positive and negative lightning surge events. The surge protection diodes are configured not to present a non-linear conduction path to the 2.3 MHz FTM signal.

Signal combiner 30 is operative to perform a signal combining (i.e., summing) function. According to an exemplary embodiment, signal combiner 30 combines the amplified signals provided from variable gain amplifiers 28 and outputs the resultant signals onto a transmission medium such as coaxial cable for transmission to one or more IRDs 60 via signal splitters 40.

Transceiver 32 is operative to enable communications between FTM 20 and IRDs 60. According to an exemplary embodiment, transceiver 32 receives various signals from IRDs 60 and relays those signals to controller 34. Conversely, transceiver 32 receives signals from controller 34 and relays those signals to one or more IRDs 60 via signal splitters 40. Transceiver 32 may for example be operative to receive and transmit signals in one or more predefined frequency bands.

Protection circuit 35 is operative to pass desired signals, such as FTM control signals and television signals without distortion while protecting the IRD 60 circuitry from lightning surge and other environmental electrical disturbances. According to an exemplary embodiment, protection circuit 35 comprises surge protection diodes implemented to absorb energy from positive and negative lightning surge events. The surge protection diodes are configured not to present a non-linear conduction path to the 2.3 MHz FTM signal or the incoming television signals transmitted from the FTM 20.

Tuner 36 is operative to perform a signal tuning function responsive to a control signal from IRD controller in response to a channel selection from the user. According to an exemplary embodiment, the tuner receives an RF signal from protection circuit 35, and performs the signal tuning function by filtering and frequency down converting (i.e., single or multiple stage down conversion) the RF signal to thereby generate an intermediate frequency (IF) signal. The RF and IF signals may include audio, video and/or data content (e.g., television signals, etc.), and may be of an analog signal standard (e.g., NTSC, PAL, SECAM, etc.) and/or a digital signal standard (e.g., ATSC, QAM, QPSK, etc.).

Transceiver 37 is operative to enable communications between FTM 20 and IRDs 60. According to an exemplary embodiment, transceiver 37 receives various signals from FTM 20 and relays those signals to the IRD controller. Conversely, transceiver 37 receives signals from IRD controller and relays those signals to the FTM via coaxial cable and protection circuits 31 and 35. Transceiver 37 may for example be operative to receive and transmit signals in one or more predefined frequency bands.

The LNB power supply 38 is operative to generate the required operating DC power for the LNBs when the system is operating in Legacy LNB mode. According to an exemplary embodiment, the LNB power supply 38 is a conventional LNB power supply comprising a DC to DC, Boost switching power supply, with the ability to power down or disable the output. The LNB power supply comprises a linear regulator which can superimpose a 22 kHz tone onto the DC output voltage. The output of the linear regulator is typically a push-pull type, but can equally be other configurations, such as emitter follower type output.

The switch 33 is operative to couple the LNB power supply 38 to the protection circuit 35 with a low impedance when the IRD 60 is operating in the Legacy mode. The switch 33 decouples the LNB power supply 38 from the protection circuit 35 with a high impedance when the IRD 60 is operating in the FTM mode.

The DiSEqC encoder and decoder 39 is operative to generate the required control tones to communicate to the LNBs when the IRD is operating in the Legacy mode. According to an exemplary embodiment, there are two 22 kHz tone modes, constant tone and two-way pulse width modulated (PWM) tone control mode. When the LNB regulator is transmitting tone, the DiSEqC encoder and decoder 39, through the LNB power supply 38, provide a low impedance output to the switch 33.

Figure 4:
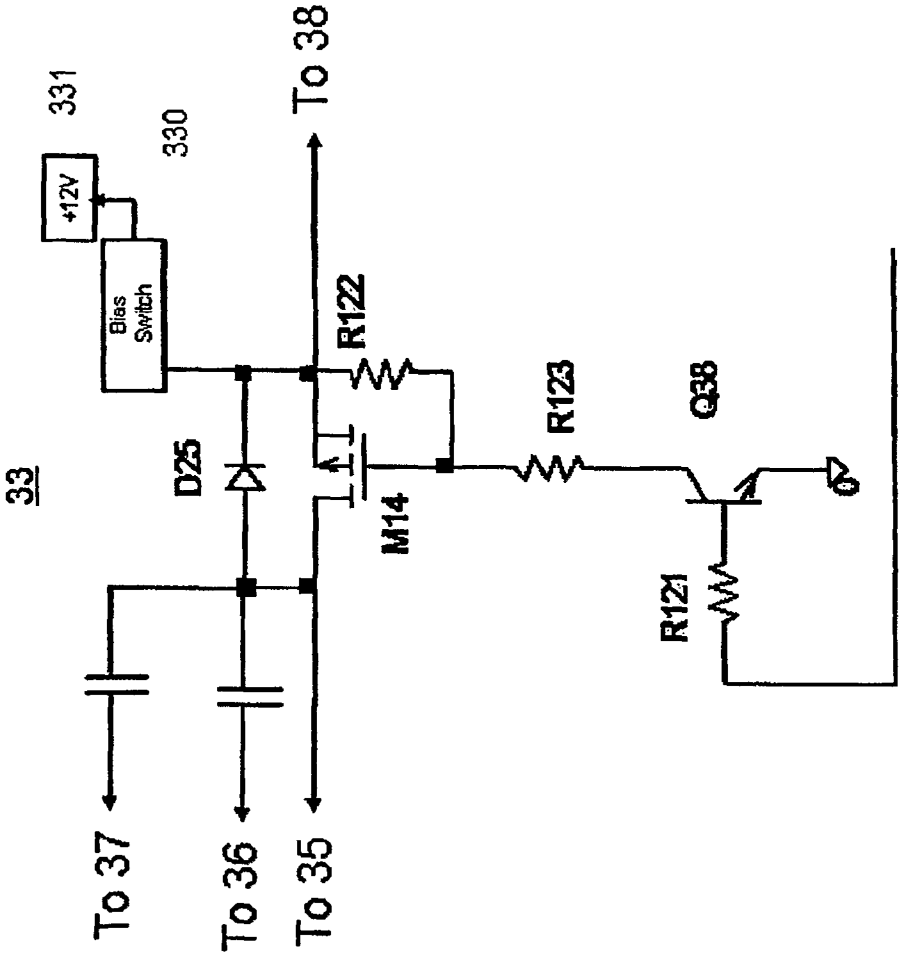
FIG. 4 is a diagram showing further details of the transceiver switching means according to an exemplary embodiment of the present invention.

FIG. 4 is a diagram of an exemplary embodiment for implementing the present invention showing further details the switch 33 of FIG. 3 an its interconnectivity between the protection circuit 35, the tuner 36, transceiver 37, and LNB power supply 38, of FIG. 3. The switch comprises a first resistor R121, a second resistor R122, a third resistor R123, a MOSFET transistor M14, a MOSFET protection diode D25, a bipolar transistor Q38, a bias switch 330 and a positive 12 volt DC supply 331.

The MOSFET transistor M14 is operative to isolate the FTM transceiver 37, the tuner 36, and the protection circuitry 35 from the LNB power supply 38 when the IRD 60 is in the FTM mode of operation. When the IRD 60 is in the Legacy mode of operation, the MOSFET transistor M14 is operative to provide a low impedance coupling between the LNB power supply 38 and the protection circuitry 35. The protection circuitry 35 provides a wideband, low impedance coupling to either the FTM 20 in FTM mode or directly to the LNB during Legacy mode. The ability of the MOSFET transistor M14 to isolate the low impedance of the LNB power supply 38 from the 2.3 MHz FTM network makes the impedance of the LNB supply adaptable. The adaptability is accomplished with the MOSFET transistor M14 biased “On” in the Legacy mode and Biasing “Off” in the FTM mode. MOSFET M14 looks like an open drain to the FTM output node when biased “Off”. This MOSFET connects the protection circuit 35 to the low impedance of the LNB voltage source Power Supply 38. When biased “Off”, M14 provides a high impedance (open drain) to the transceiver 37. In the FTM mode, transistor Q38 is biased “Off” by setting the base to zero volts. With transistor Q38 biased “off” it functions as an open collector. The third resistor R123 then is selected at a sufficient resistance to bias the gate of MOSFET M14 to the same voltage as the source of MOSFET 14. This makes the drain of MOSFET 14 a high impedance open drain to the transceiver 37. Transistor Q38 is biased by a control voltage (not shown) applied at the base of transistor Q38. This control voltage can be generated by a microprocessor, a control circuit, the bias switch 330 or by the LNB power supply 38. The LNB power supply 38 may be only operational during the Legacy mode of operation and therefore would require MOSFET M14 to be biased “On.”

The bias switch 330 and 12 volt DC supply 331 are operative to ensure that the MOSFET 14 and MOSFET protection diode D25 is biased off during operation in the FTM mode. To accomplish this bias requirement the bias switch 330 provides 12 volts to the source of the switching MOSFET transistor M14 and MOSFET protection diode D25 when the system is in the FTM mode. This accomplishes two goals, it properly biases the MOSFET in the “Off” position and reverse biases the MOSFET protection diode D25. When the LNB power supply output is at zero volts, if the source of the MOSFET transistor M14 were also at zero volts, M14 could bias “On” during portions of the 2.3 MHz FTM waveform and MOSFET protection diode D25. The 12 volts on the source/gate of M14 prevents this and MOSFET M14 is no longer capable of being biased “on”. MOSFET M14 drain becomes a high impedance. R125 hold Node 15 at the zero voltage level.

When utilizing the MOSFET M14 in this configuration, it is possible to place the protection circuit 35 directly on the output node of the LNB, power supply 38 regulator. This prevents the LNB regulator 38 output from reaching damaging levels at high surge levels. If a relay were used, the protection circuit 35 would have to go on the I/O side of the relay and would need the additional standard bipolar diode to provide an “Off” bias. The standard bipolar diode drop (under surge) adds to the transient voltage suppression diode drop and thus does not protect the LNB regulator as well.

Figure 5:
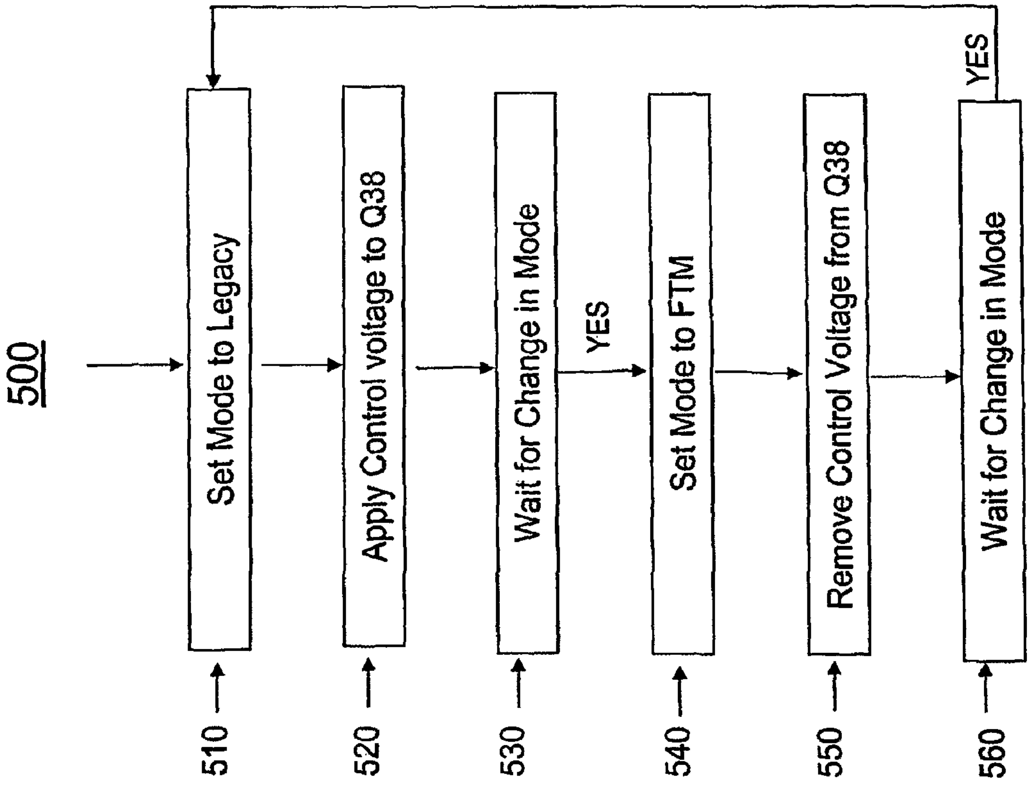
FIG. 5 is a state diagram of an exemplary embodiment of the operation of circuitry according to the present invention.

FIG. 5 is a state diagram 500 of an exemplary embodiment of the operation of circuitry according to the present invention. In the exemplary embodiment, the circuitry it is predetermined to initialize the IRD in the Legacy mode. However, it should be appreciated that this selection is design dependent and either the Legacy or FTM modes may be chosen for initialization and both initialization arrangements are in accordance with principles of the present invention.

At step 510, the operating mode of the IRD is set to Legacy mode or the equivalent. In the exemplary embodiment, the mode is stored to memory within the microprocessor of the IRD.

At step 520, the control voltage is applied to the base of transistor Q38 of FIG. 4. This has the effect of generating a low impedance between the collector of transistor Q38 and the emitter of transistor Q38. This low impedance effectively sets the gate of MOSFET M14 to the reference potential coupled to the emitter of transistor Q38. When the LNB power supply output reaches a sufficient positive voltage, the difference in potential across the second resistor R122 biases the MOSFET M14 “ON” and a low impedance coupling in made between the LNB power supply 38 and the protection circuit 35 (FIG. 3).

At step 530 the IRD waits for a control signal indicating a change in mode. In this exemplary embodiment, the request for change in mode is made by a user through the user interface of the IRD or by system software control decision. However, is should be appreciated that a request for change in mode can be generated in a number of ways, such as supplied through the satellite transmission by the broadcaster, or through software resident in the IRD in response to changing operating conditions. Any of this means for generating a change in mode of operation can be implemented by the present invention with equal success.

After a request for change of mode is received, the operating mode of the IRD is set to FTM mode or the equivalent at step 540.

At step 550, the control voltage is removed from the base of transistor Q38 of FIG. 4. This has the effect of essentially generating an open circuit between the collector of transistor Q38 and the emitter of transistor Q38. This open circuit effectively sets the gate of MOSFET M14 to the voltage applied to the source of MOSFET M14. The small difference in potential across the second resistor R122 biases the MOSFET M14 “OFF” and a high impedance isolation is then created made between the LNB power supply 38 and the protection circuit 35 (FIG. 3). To ensure that continued biasing “OFF” of the MOSFET M14, the biasing switch 330 of FIG. 4 is set such that the +12 Volt DC voltage 331 of FIG. 4 is applied to the source, and subsequently to the gate, of MOSFET M14.

At step 560 the IRD waits for a control signal indicating a change in mode. Once a request for change in mode is received, the system returns to step 510.

As described herein, the present invention provides an architecture and protocol for enabling signal communications between an FTM and an IRD within a dwelling. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An apparatus comprising:

a power supply operative to provide an operating DC voltage for a low noise block (LNB) converter in a legacy mode of operation, said power supply exhibiting a low output impedance to a reference potential;

a DiSeqC encoder and decoder coupled to said power supply operative to generate a control tone for communicating to said LNB converter in said legacy mode of operation;

a transceiver coupled to an output point including a protection circuit operative to bi-directionally communicate with a frequency translation module; and a switching device including first and second transistors coupled between said output point and said power supply operative to couple said power supply to said output point in said legacy mode of operation and to decouple said power supply from said output point in an FTM mode of operation so that an FTM carrier generated by said transceiver may not be distorted by said low output impedance of said power supply.

2. The apparatus of claim 1, wherein said first transistor is a MOSFET having gate, source, and dram, electrodes;

said source electrode is coupled to a voltage source;

said drain electrode is coupled to said transceiver and said output point;

said source and drain electrodes are coupled via a protection diode, said protection diode is reversely biased in said FTM mode of operation;

said second transistor is a bipolar transistor having base, emitter, and collector electrodes;

said emitter electrode is coupled to said reference potential;

said base electrode receives a control signal via a first resistance element for changing said mode of operation from said FTM mode to said legacy mode;

said source electrode of said MOSFET is coupled to said gate electrode of said MOSFET via a second resistance element; and said collector electrode of said bipolar transistor is coupled to said gate electrode of said MOSFET via a third resistance element.

* * * * *